United States Patent [19]

Moffitt

[11] 4,334,828
[45] Jun. 15, 1982

[54] HELICOPTER BLADE WITH A TIP HAVING A SELECTED COMBINATION OF SWEEP, TAPER AND ANHEDRAL TO IMPROVE HOVER EFFICIENCY

[75] Inventor: Robert C. Moffitt, Seymour, Conn.

[73] Assignee: United Technologies Corporation, Hartford, Conn.

[21] Appl. No.: 114,137

[22] Filed: Jan. 21, 1980

[51] Int. Cl.³ ............................................. F01D 5/12
[52] U.S. Cl. .................................................. 416/228
[58] Field of Search ........................ 416/228 R, 228 A

[56] References Cited

U.S. PATENT DOCUMENTS

| | | | |
|---|---|---|---|
| 3,399,731 | 9/1968 | Giles | 416/228 A |
| 3,721,507 | 3/1973 | Monteleone | 416/228 A |
| 4,077,741 | 3/1978 | Lowson et al. | 416/228 A |
| 4,130,377 | 12/1978 | Blackwell | 416/228 A |

OTHER PUBLICATIONS

Weller, W. H., "Experimental Investigation of Effects of Blade Tip Geometry on Loads and Performance for an Articulated Rotor System", NASA Tech. Paper 1303, Avradcom Tech. RPT 78-53, Jan. 1979, pp. 1-76.

Primary Examiner—Robert E. Garrett
Attorney, Agent, or Firm—Vernon F. Hauschild

[57] ABSTRACT

A helicopter blade of moderate twist having an improved tip utilizing a combination of sweep, taper and anhedral to improve hover performance by unloading the blade tip and reducing the strength of the tip vortex and displacing that tip vortex away from the following blade surface.

9 Claims, 6 Drawing Figures

HELICOPTER BLADE WITH A TIP HAVING A SELECTED COMBINATION OF SWEEP, TAPER AND ANHEDRAL TO IMPROVE HOVER EFFICIENCY

DESCRIPTION

1. Technical Field

This invention relates to helicopter rotors and more particularly to improved blades for use therein having a tip of selected sweep, taper and anhedral to improve hover efficiency.

2. Background Art

In the helicopter art, blade tip sweep or taper, or combinations of both have been used to improve helicopter forward flight performance. To reduce tip lift, however, this prior art utilized a substantial amount of twist in the blade tip and had to pay the penalty of divergence of drag resulting in increased rotor drive power requirements in forward flight due to the negative pitch or angle of attack on the advancing blade. Typical examples of the prior art using swept or tapered tips to increase helicopter forward flight performance and utilizing twist to unload the tip and control tip trailing edge vortex are Jepson U.S. Pat. No. 3,822,105 and pending Fradenburgh U.S. Application Ser. No. 968,595 entitled "Improved Helicopter Blade" and filed Dec. 11, 1978. Monteleone U.S. Pat. No. 3,721,507 teaches sweep and tip thinning but not anhedral, nor is Monteleone concerned with hover. Lowson et al U.S. Pat. No. 4,077,741 utilizes a helicopter blade with a swept tip but for the purpose of controlling a tip leading edge vortex, as opposed to the trailing edge tip vortex of interest herein, so as to cause the tip to act as a conventional Delta wing.

Certain prior art patents teach anhedral blade or wing tips, but not in combination with sweep and taper as taught herein to improve helicopter hover performance. Sargent U.S. Pat. No. 3,411,738 teaches an anhedral tip but specifically teaches that the tip span should be small in comparison to the tip chord, which is in direct opposition to my teaching. de la Cierva U.S. Pat. No. 1,692,081 teaches droop or tip anhedral but to improve the dynamic behavior of freely rotating autogiro wings. de la Cierva uses the drooped tips to provide the blade rotational centrifugal forces necessary to make the hinged, autogiro rotor stable. Of course, since the autogiro utilizes freely rotating wings it does not offer the hover operation of the power driven helicopter rotor to which my invention is directed.

Giles U.S. Pat. No. 3,399,731 teaches swept helicopter rotor wings to improve forward flight operation but includes no anhedral and is not concerned with hover performance improvement.

DISCLOSURE OF INVENTION

A primary object of the present invention is to provide an improved torsionally compliant and moderately twisted helicopter rotor blade which utilizes a tip of selected sweep, taper and anhedral form to improve hover performance.

In accordance with the present invention, the selectively swept, tapered and anhedral tip of my improved helicopter blade serves to unload the tip thereby achieving a more uniform lift distribution throughout the span of the blade, and similarly producing a more uniform downwash effect, while decreasing the power required to drive the rotor.

It is a further object of my invention to improve hover performance by using my improved helicopter blade utilizing a selectively swept, tapered and anhedral tip, and without utilizing twist in the blade tip.

It is still a further object of my invention to use such an improved helicopter blade to improve hover performance, and whose selectively swept, tapered and anhedral tip both weakens the trailing edge tip vortex and directs that vortex away from the following blade.

It is a further object of my invention to teach such a helicopter blade which achieves the advantageous weak tip vortex of an unloaded blade tip and the advantageous, weakened, interfering trajectory of the tip vortex of a loaded blade tip.

It is still a further object of my invention to teach such an improved helicopter blade in which the blade tip anhedral extends along the blade span a distance at least equal to one blade chord length.

It is a further object of my invention to teach a helicopter blade with a selectively swept, tapered and anhedral tip all extending over at least the outer 8%±2% of the blade for blades used in rotors having four or more blades, and over at least the outer 13%±2% of the blade radius R for blades used in two bladed rotors, and at least 7% of the blade radius R for rotors with more than four blades and which tip is particularly adapted for use with a helicopter blade having torsional compliance and moderate blade twist so that the moderately twisted blade will respond to aerodynamic loading in hover operation to produce compliant torsional motion thereof to bring the blade to the optimum pitch in hover.

It is a further object of this invention to teach such an improved helicopter blade in which the combination of sweep, taper and anhedral in the blade tip increases hover efficiency between 3 and 5% which is equivalent to a 3% reduction in rotor diameter, increases rotor lift about 300 pounds for 10,000 lb. helicopters and about 2,000 pounds for 70,000 lb. helicopters, and which, for the same gross helicopter weight, increases hover ceiling 700-800 feet.

BEST MODE FOR CARRYING OUT THE INVENTION

Figure 1:
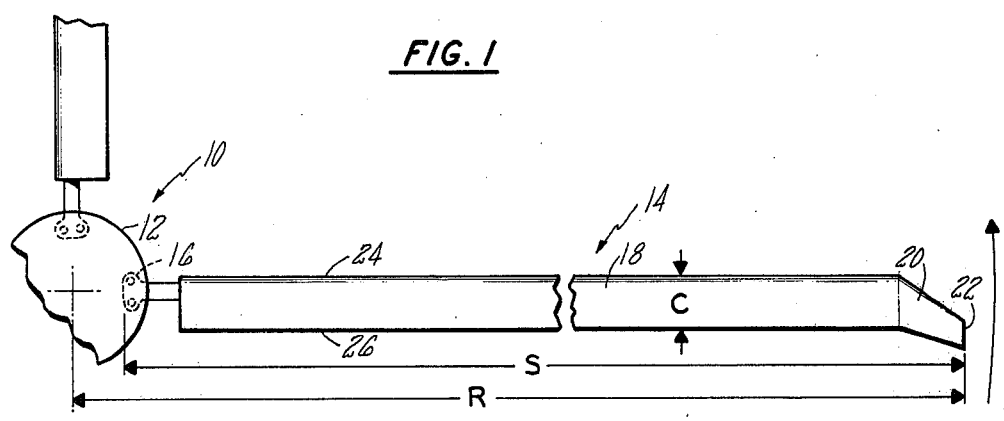
FIG. 1 is a partial plan view of a four bladed helicopter rotor using my improved blade.

Referring to FIG. 1 we see helicopter rotor 10 utilizing my improved blade. Helicopter rotor 10 includes hub member 12 which is conventionally supported from a helicopter fuselage to be driven for rotation about the axis of rotation. A plurality of helicopter blades 14 projects substantially radially from hub 12 and are supported therefrom in conventional fashion by root attachment 13. Any number of blades 14 may be used with rotor 10 and the rotor illustrated partially in FIG. 1 is a four bladed rotor with each blade separated circumferentially approximately 90°. Since each blade 14 will be identical, a single blade only will be described.

Still referring to FIG. 1 we see that blade 14 includes root portion 16 which attaches in conventional fashion to hub 12, central portion 18 of aerodynamic shape, and tip portion 20 which culminates in blade tip 22. Blade portions 16, 18 and 20 cooperate to define blade span S and further cooperate with hub 12 to define blade radius R. The blade chord C extends between the blade leading edge 24 and the blade trailing edge 26.

My improved helicopter blade is fabricated with a selectively shaped tip which includes a selected combination of rearward sweep, taper, and anhedral which coact to unload the blade tip, thereby producing a more uniform lift distribution throughout the span S of the blade and also producing a more uniform downwash effect, as well as decreasing the power required to drive the rotor 10. My improved blade, with its unique combination of sweep, taper and anhedral in its tip, reduces the intensity of the tip trailing edge vortex and also directs or displaces the tip trailing edge vortex so that it causes minimal interference on the following blade. These advantages are accomplished without the need for utilizing twist in the blade tip.

Figure 2:
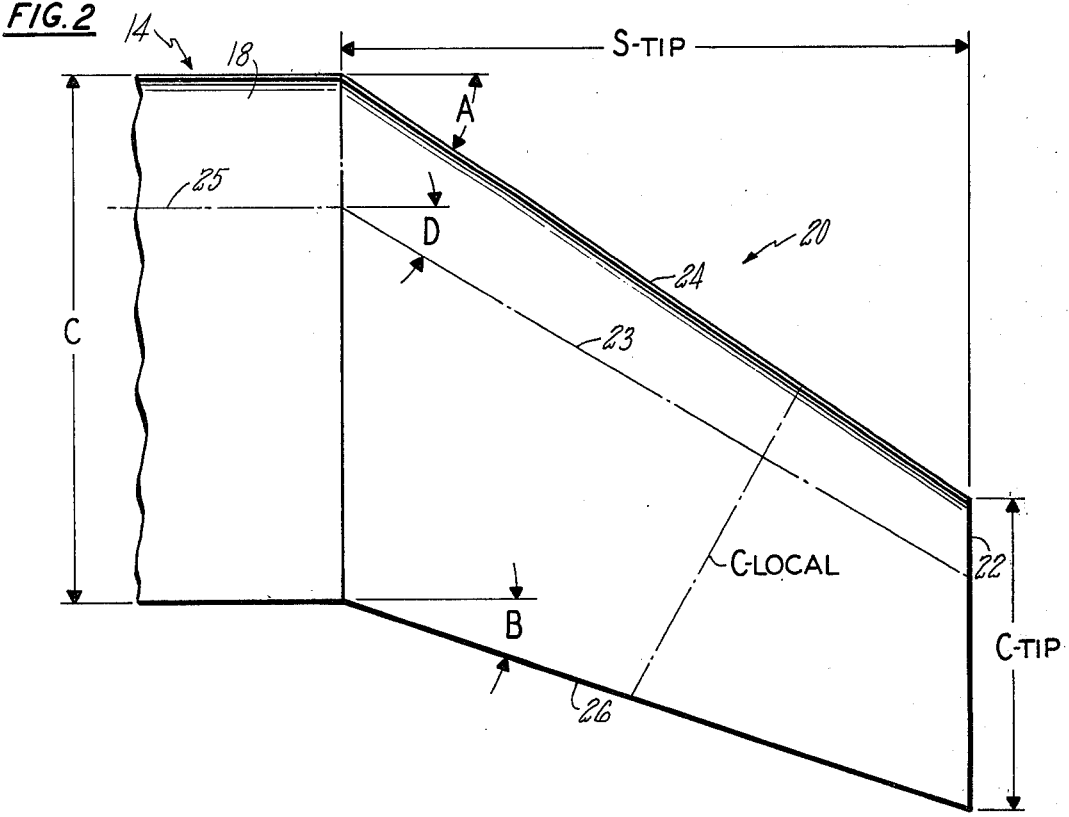
FIG. 2 is a plan view of the tip portion of my improved helicopter blade.

The specific shape of my improved blade tip portion 20 will now be described with reference to FIGS. 2 and 3. As shown in FIG. 2, tip portion 20 is swept rearwardly with leading edge 24 being swept rearwardly angle A and trailing edge 26 being swept rearwardly angle B. Angle A is approximately twice angle B with angle A being preferably 33°±2°, and angle B being preferably 18°±2°. Tip portion 20 is also tapered in a radially outward direction so that the blade tip chord C tip at blade tip 22 is approximately ½ the blade chord C, and preferably equal to 0.6C. As further shown in FIG. 2, the tip portion quarter chord 23 is swept rearwardly angle D with respect to blade quarter chord and feathering axis 25. Angle D is preferably about 30°±2°, to give tip portion 20 an effective sweep of 30°±2°. Tip portion 20 varies in thickness between dimension t at its inner end, which is equal to the thickness of blade central portion 18, and tip thickness $t_{tip}$, which is approximately t/2, and preferably 0.6t, so that the chord-to-thickness ratio of the tip portion 20 is constant.

Figure 3:
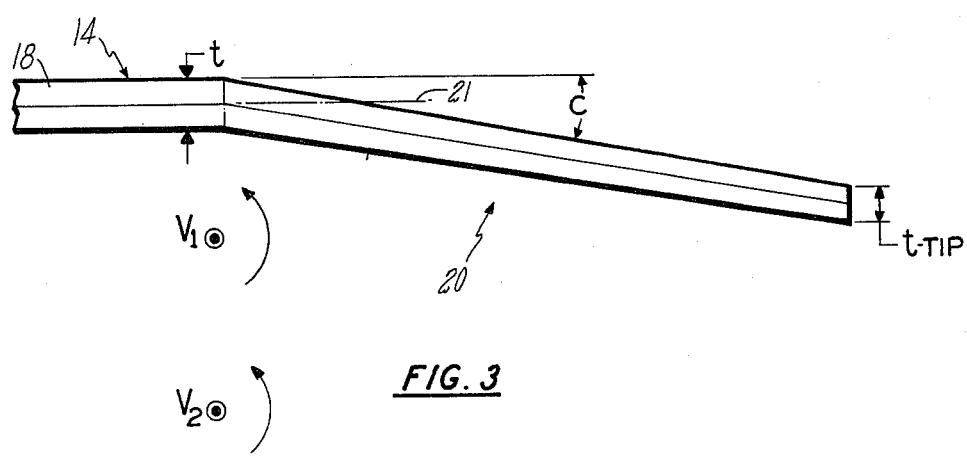
FIG. 3 is a side view, corresponding to FIG. 2, of the tip portion of my improved helicopter blade.

In addition to being swept and tapered as shown in FIG. 2, tip portion 20 incorporates anhedral as shown in FIG. 3 so that it droops downwardly angle C, which is preferably 10°±2°.

For reasons to be explained hereinafter, it is important that the tip portion 20 extend a selected span dimension $S_{tip}$ since my tip is deemed to be particularly useful in combination with a blade which is torsionally compliant and which has moderate twist, for example about −19°, so that during hover operation tip and blade aerodynamic loading will cause the blade to elastically deform torsionally to a twist of about −16° for optimum hover operation. Full particulars concerning such a torsionally compliant blade may be found in Blackwell U.S. Pat. No. 4,130,377.

It will therefore be seen that my improved tip portion 20 is swept, tapered and anhedral in selected proportions. In addition, tip portion 20 is preferably of 0° linear twist. The reasons for this selected combination of sweep, taper, anhedral and twist in blade tip portion 20 will now be explained.

As explained previously, my objective is to unload blade tip portion 20 to obtain a more uniform lift distribution throughout the span of the blade, a more uniform downwash effect, and decreased power requirements to drive the rotor, to also reduce the intensity of the tip vortex and to deflect or displace the tip vortex so that it presents minimal interference with the following blade. These objectives should be borne in mind to fully appreciate the following description of the selectively shaped tip portion 20.

With respect to rearward sweep of tip portion 20, this rearward sweep serves to reduce blade tip loading since the parameter which determines the amount of lift generated by a blade is the velocity component of the free airstream perpendicular to the local quarter chord line, and sweeping the blade tip rearwardly as shown in FIG. 2 reduces this velocity component and hence the lift generated by the tip. The tip local chord is indicated as $C_{local}$ in FIG. 2. This reduction of tip lift due to tip sweep serves to reduce the intensity of the trailing edge tip vortex generated and shed during rotor operation by reducing the free stream velocity acting parallel to the local swept chord $C_{local}$.

Tip sweep further unloads the blade tip in that the swept tip doesn't receive the full pitch inputs which the remainder of the blade receives and hence the tip does not have to take the full pitch change loads which are imposed upon the remainder of the blade.

Tapering of tip 20 as shown in FIG. 2 also serves to reduce blade tip loading by reducing the tip planform area on which aerodynamic loads are imposed, and thereby also reduces the intensity of the tip trailing edge vortex.

Unfortunately, reduction of the tip trailing edge vortex by the combination of sweep and taper just discussed has the adverse effect of changing the trajectory of the shed tip vortex in an undesirable fashion. This changed tip vortex trajectory brings the reduced intensity tip vortex into more intimate contacts with the following blade and therefore has a more pronounced effect upon the following blade.

It would be desirable if the blade tip could achieve the weak tip vortex of an unloaded blade tip and the desirable trajectory of the tip vortex of a loaded blade tip which has a decreased interference effect upon the following blade. This desirable result is accomplished by utilizing an anhedral component as shown in FIG. 3 with the swept and tapered tip. It is a known characteristic of a shed helicopter tip vortex that its trajectory contracts or diminishes in radius so that, with an anhedral tip, due to the contraction in radius of the shed tip vortex of a forward blade, that tip vortex will pass below the following blade in view of its radial contraction and the anhedral shape of the following blade. As illustrated in FIG. 3, whereas the tip vortex shed from the preceeding blade would be at station $V_1$ with a conventional, nonanhedral (flat) tip, that tip vortex shed from the preceeding blade is further displaced from the following blade to be at station $V_2$ when an anhedral tip is used. The advantage of this tip vortex displacement from station $V_1$ to station $V_2$ is less interference with the following blade. A further advantage of our anhedral tip in causing the tip vortex to pass substantially below the following blade at station $V_2$ is that this separation of the vortex from the tip reduces the effect of the vortex on the blade tip, which effect generally is to impart lift to the tip and hence loads the tip in contradiction to my teaching.

It will therefore be seen that my improved helicopter blade with selectively swept, tapered and anhedral tip serves to unload the tip and obtain the above stated advantages thereof and also effectively reduces the intensity of the tip vortex and displaces it to a station of minimal interference upon the following blade. These advantages are accomplished without the need to use twist in the tip portion.

Figure 4:
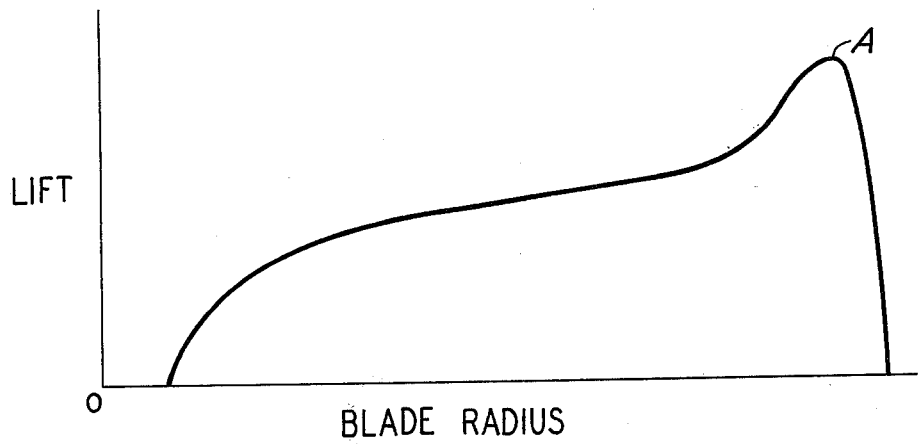
FIG. 4 is a graph showing the relationship between lift and blade radius for a helicopter rotor during hover operation.

To achieve maximum benefit from my combination of sweep, taper and anhedral in my blade tip, it is important that the tip span be sufficient that the tip include the region of maximum blade lift. As best shown in FIG. 4, maximum blade lift is experienced at point A along the blade span. Point A is at about the 92% blade radius station for four bladed rotors. For two bladed rotors, the maximum lift point is at about the 88% radius station, and for six bladed rotors the maximum lift point is at about the 94% radius station. It is important that the tip span $S_{tip}$ be sufficient that the maximum load point of the blade be located on the blade tip. Therefore, when used with a four bladed rotor tip span $S_{tip}$ should be 8% blade span S, when used with a two bladed rotor tip span $S_{tip}$ should be about 13% blade radius R, and when used with a rotor having greater than four blades the tip span $S_{tip}$ would be about 7% blade radius R but not less than 6% blade radius R. The blade maximum lift point is also approximately the area where the shed tip vortex intersects the following blade therefore commencing blade tip sweep, taper and anhedral inboard of the maximum lift area also results in commencing blade tip sweep, taper and anhedral inboard of the area of tip vortex interference. A benefit to be gained by initiating blade sweep at a point inboard of the interfering tip vortex location is that the blade discontinuity at the sweep junction will be located in the low angle of attack region which occurs on the inboard side of the interfering tip vortex. The blade tip region outboard of the interfering tip vortex experiences upwash from the vortex flow and resulting high angle of attack. Blade discontinuities caused by sweep initiation are subject to flow separation and result in high drag penalties when they are placed in the high angle of attack inboard region and these resulting drag penalties are avoided by commencing sweep inboard of the interfering tip vortex location.

Figure 5:
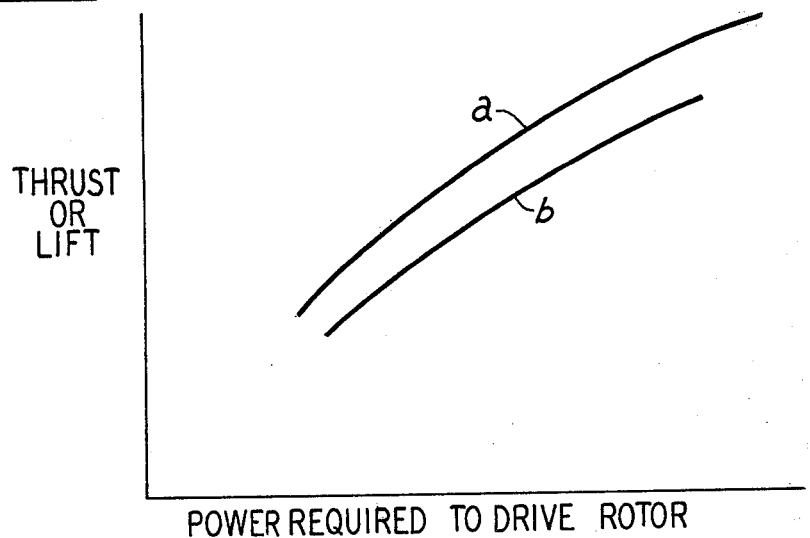
FIG. 5 is a graph showing the thrust or lift generated plotted against the power required to drive the rotor for a helicopter rotor utilizing my improved blade, as compared to a helicopter rotor utilizing prior art blades.

The effectiveness of my improved rotor blade can be appreciated by viewing FIG. 5 which is a plot of the thrust or lift of rotors in hover using my improved blade and prior art blades plotted against the power required to drive the rotor. It will be noted that the rotor using my blade shows greater efficiency in curve a than does the rotor with prior art blades of curve b. Calculations and testing shown that my improved blade increases hover efficiency or lift between 3 and 5%. This translates to hover lift increase of about 300 pounds for a 10,000 lb. helicopter and up to 2,000 pounds for a 70,000 lb. helicopter. For the same gross weight helicopter, hover ceiling would increase between 700–800 feet. In addition, my improved rotor will experience a reduction in rotor-induced noise.

While the main objective of my improved blade is to increase helicopter hover performance, it also provides advantages in forward flight operation since the swept tip reduces the tip Mach number, which is proportional to the effective air velocity in the direction of the tip local chord. Further, the vibratory torsional moments caused by the swept tip tend to cancel adverse torsional moments which are created by blade aerodynamic pitching moments in forward flight.

Figure 6:
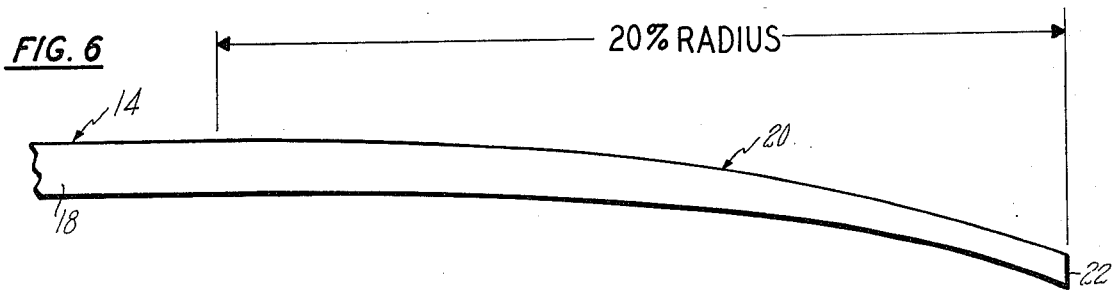
FIG. 6 is a modified anhedral form for the blade tip portion of my improved helicopter blade.

It will be evident to those skilled in the art that while I have discussed a specific combination of blade tip sweep, taper and anhedral with the objective of both weakening and displacing the tip vortex so as to present minimal interference with the following blade and hence increase hover efficiency and decrease the power required to drive the rotor in hover, more or less sweep, taper and anhedral may be required to accomplish my overall objective depending upon the characteristics of the particular helicopter upon which the rotor will be used. For example, while in my preferred embodiment I use approximately 10° anhedral in my tip portion 20 over 1.192 blade chord C to produce a blade tip displacement out of rotor plane 21 equal to about 0.014 blade radius R, this same degree of anhedral can be accomplished by utilizing a gentle flatwise blade curvature over the outer 20% of blade span as shown in FIG. 6. In the FIG. 6 construction, the tip taper and sweep would remain as shown in FIG. 2. A greater anhedral angle or an increased degree of curvature may be utilized to displace the tip vortex if the requirements of the helicopter of interest so require. My experience has been that the blade tip portion 20 should be swept and tapered as described and be of anhedral shape or drooped throughout at least one blade chord dimension C. Further, the blade tip portion 20 should extend throughout the outer 8% of the blade span for a four bladed rotor, throughout 13% of the blade radius R for a two bladed rotor and throughout 6% of the blade radius R for a rotor having a number of blades in excess of four. In my preferred embodiment, helicopter blade 14 is an integral blade.

As stated earlier, my improved helicopter blade is a blade which is fabricated to be torsionally compliant by any of the well-known methods and constructions of the prior art, including those taught in Blackwell U.S. Pat. No. 4,130,377, and which has moderate blade twist of about $-10°$ so that during hover operation aerodynamic loading of the blade and tip will cause the blade to torsionally deflect to bring the blade to optimum hover twist of about $-16°$. It will be evident to those skilled in the art that my tip could be used with a torsionally stiff blade having appropriate leading edge counterweighting. The particular blade tip portion 20 taught herein takes maximum advantage of the hover efficiency improvements available by having the tip portion commence inboard of the blade maximum lift area and the area of tip vortex interference. There are helicopter blade constructions which are not as torsionally compliant as the blade of interest herein and which are built with a high degree of blade twist for a variety of manufacturing and performance reasons other than hover performance, which will require the use of a different swept, taper and anhedral tip than that taught herein. One such improved blade is taught in the patent application filed on even date herewith in the names of Fradenburgh, Jepson and Moffitt and entitled "Improved Helicopter Blade With a Tip Having a Selected Combination of Sweep, Taper and Anhedral to Improve Hover Efficiency".

I wish it to be understood that I do not desire to be limited to the exact details of construction shown and described, for obvious modifications will occur to a person skilled in the art.

I claim:

1. A helicopter blade having moderate blade twist, a leading edge, a trailing edge, a root, a tip, a chord dimension extending between said edges, and being fabricated so that aerodynamic blade loading during rotor hover operation will induce torsional deflection of the blade to a preferred pitch position and thereby improve rotor performance and reduce the total power required to drive the rotor and including:

a root section adapted to be connected to a helicopter rotor hub for rotation therewith about an axis of rotation, a central portion of selected aerodynamic shape connected to and extending outwardly from the blade root portion, a tip portion connected to and extending outwardly from the blade central portion to establish a blade radius between the axis of rotation and the blade tip, said blade tip portion being selectively shaped to improve helicopter hover performance by diminishing the intensity of the tip vortex generated during hover operation and directing the tip vortex away from the following blade to minimize interference therewith, said tip portion extending for approximately 8%±2% of blade radius for blades to be used in rotors of four or more blades, and 13%±2% for blades to be used in two bladed rotors, said tip portion being swept rearwardly to reduce the velocity of the air in the perpendicular to tip local quarter chord line to thereby reduce blade tip loading and the strength of the tip vortex generated in hover, said tip portion leading edge being swept rearwardly approximately an angle of twice the magnitude of the rearward sweep of the tip portion trailing edge, said tip portion also being tapered so that the chord dimension at its outboard end is approximately ½ the chord dimension at its inboard end to reduce tip portion area and to thereby further reduce blade tip loading and the strength of the tip vortex generated in hover, and said tip portion also being deflected downwardly throughout a portion of the blade tip equal to at least one blade chord dimension so as to direct the tip vortex away from the following blade in hover.

2. A helicopter blade according to claim 1 wherein said tip portion is deflected downwardly throughout its span at an angle of 10°±2°.

3. A helicopter blade according to claim 1 wherein said tip portion is deflected downwardly in a smooth flatwise blade curvature over approximately the outer 20% of the blade radius.

4. A helicopter blade according to claim 2 wherein said tip portion is of 0° twist.

5. A helicopter blade according to claim 4 wherein said blade has moderate equivalent linear blade twist of about −10° and is sufficiently torsionally compliant that aerodynamic blade loading during hover operation will cause torsional blade deflection to a equivalent linear blade twist of about −16°.

6. A helicopter blade according to claim 5 wherein said tip portion leading edge is swept rearwardly about 33°±2° and said tip portion trailing edge is swept rearwardly about 18°±2°, to produce an effective sweep of said tip portion of about 30°±2°.

7. A helicopter blade according to claim 6 wherein the tip chord dimension at the blade tip is 0.6 times the blade chord dimension.

8. A helicopter blade according to claim 7 wherein the tip portion thickness diminishes in an outward direction so that the ratio of the tip portion thickness to the tip portion chord is constant throughout the span of the tip portion.

9. A helicopter blade according to claim 8 wherein the root, central and tip portions are integral.

* * * * *

UNITED STATES PATENT AND TRADEMARK OFFICE
CERTIFICATE OF CORRECTION

PATENT NO. : 4,334,828
DATED : June 15, 1982
INVENTOR(S) : Robert C. Moffitt

It is certified that error appears in the above-identified patent and that said Letters Patent are hereby corrected as shown below:

Col. 5, Line 44 Delete "inboard" and insert --outboard--

Signed and Sealed this

Twelfth Day of October 1982

[SEAL]

Attest:

GERALD J. MOSSINGHOFF

Attesting Officer    Commissioner of Patents and Trademarks